Feb. 11, 1936.  N. J. HEDLUND  2,030,641
CHURN
Filed Jan. 31, 1935  3 Sheets-Sheet 1

Inventor
NELS J. HEDLUND
By Paul, Paul & Moore
ATTORNEYS

Feb. 11, 1936.  N. J. HEDLUND  2,030,641
CHURN
Filed Jan. 31, 1935  3 Sheets-Sheet 2
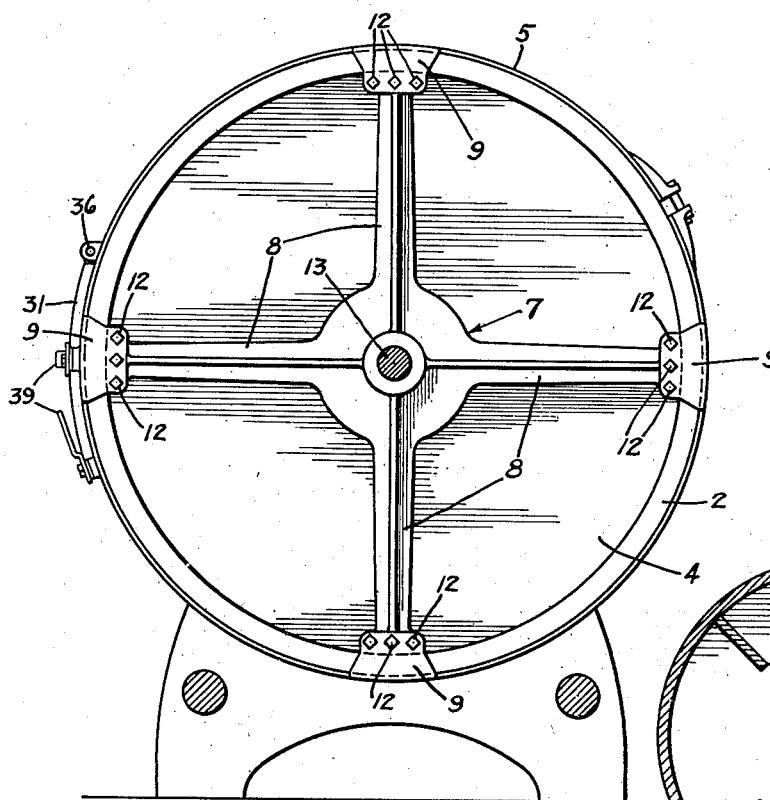
Fig. 2
Fig. 7
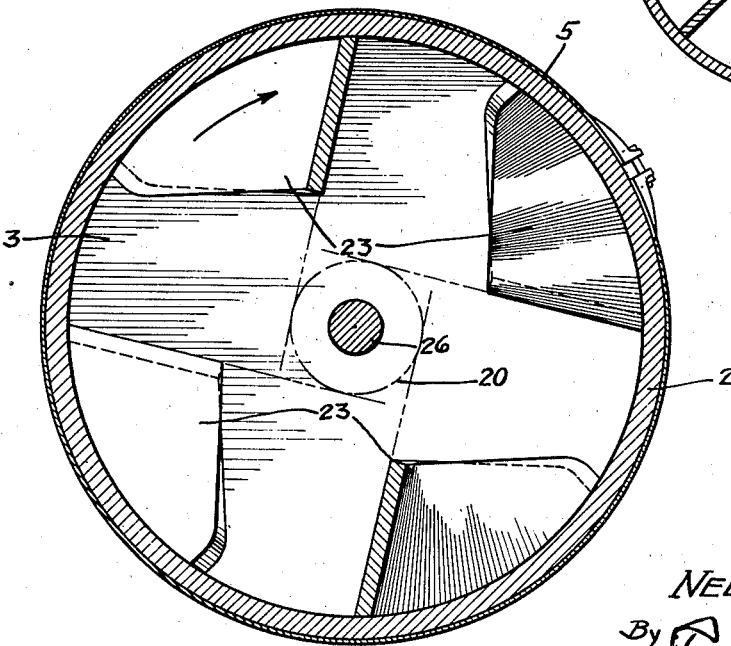
Fig. 3
Inventor
NELS J. HEDLUND
By Paul, Paul Moore
ATTORNEYS Feb. 11, 1936.  N. J. HEDLUND  2,030,641
CHURN
Filed Jan. 31, 1935   3 Sheets-Sheet 3

Inventor
NELS J. HEDLUND
By Paul, Paul &amp; Moore
ATTORNEYS

Patented Feb. 11, 1936

2,030,641

UNITED STATES PATENT OFFICE 2,030,641

CHURN

Nels J. Hedlund, Minneapolis, Minn.

Application January 31, 1935, Serial No. 4,340

8 Claims. (Cl. 259—89)

This invention relates to new and useful improvements in churns and more particularly to such churns of the revolving type.

An object of the invention is to provide a churn of simple and inexpensive construction and in which the means within the cylinder for agitating the cream and working the butter are fixedly secured therein.

A further object is to provide a churn comprising a rotatable cylinder having means therein for constantly working the contents thereof inwardly towards the center of the cylinder whereby the butter does not contact directly with the ends of the cylinder during the working process, whereby rubbing and friction is greatly minimized, with the result that the butter is less salvy and greasy. The method herein disclosed also imparts end to end and vertical concussions to the butter, which method of working the butter has been found superior to present day methods of squeezing and working it between revolving rolls or elements in the cylinder, as it produces a butter of more uniform composition.

A further object is to provide a churn comprising a cylinder having a plurality of inclined, tapering vanes fixedly mounted therein and extending inwardly from the end walls thereof, said vanes being so arranged within the cylinder that the contents thereof will constantly be worked inwardly towards the center of the cylinder, when the latter is rotated, whereby the working action imparted to the butter will be more uniform, and whereby the cylinder may be rotated at substantially the same speed for both the churning operation and the butter working operation, with the result that the driving mechanism of the churn is greatly simplified.

Other objects reside in the particular arrangement of the vanes or baffles within the cylinder, whereby the contents thereof is constantly worked inwardly towards the center of the cylinder from both ends thereof; in the provision of a baffle extending lengthwise through the cylinder and axially alined therewith, which cooperates with the vanes to agitate the cream and work the resultant butter; in the means for rotatably supporting the cylinder, whereby the interior of the cylinder is substantially free from metal parts; in the novel means for securing the trunnions of the cylinder to the ends thereof, whereby they are supported substantially independently of the end walls thereof; and, in the novel construction of the door opening in the periphery of the cylinder, and the door for closing said opening, whereby a minimum of metal is exposed to the interior of the cylinder.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 2 is a vertical sectional view on the line 2—2 of Figure 1, showing the preferred manner of securing the trunnions to the ends of the cylinder;

Figure 3 is a cross-sectional view on the line 3—3 of Figure 1, showing the means within the cylinder for agitating the cream and working the butter;

Figure 7 is a view showing a slightly modified construction wherein the vanes are radially disposed.

Figure 1:
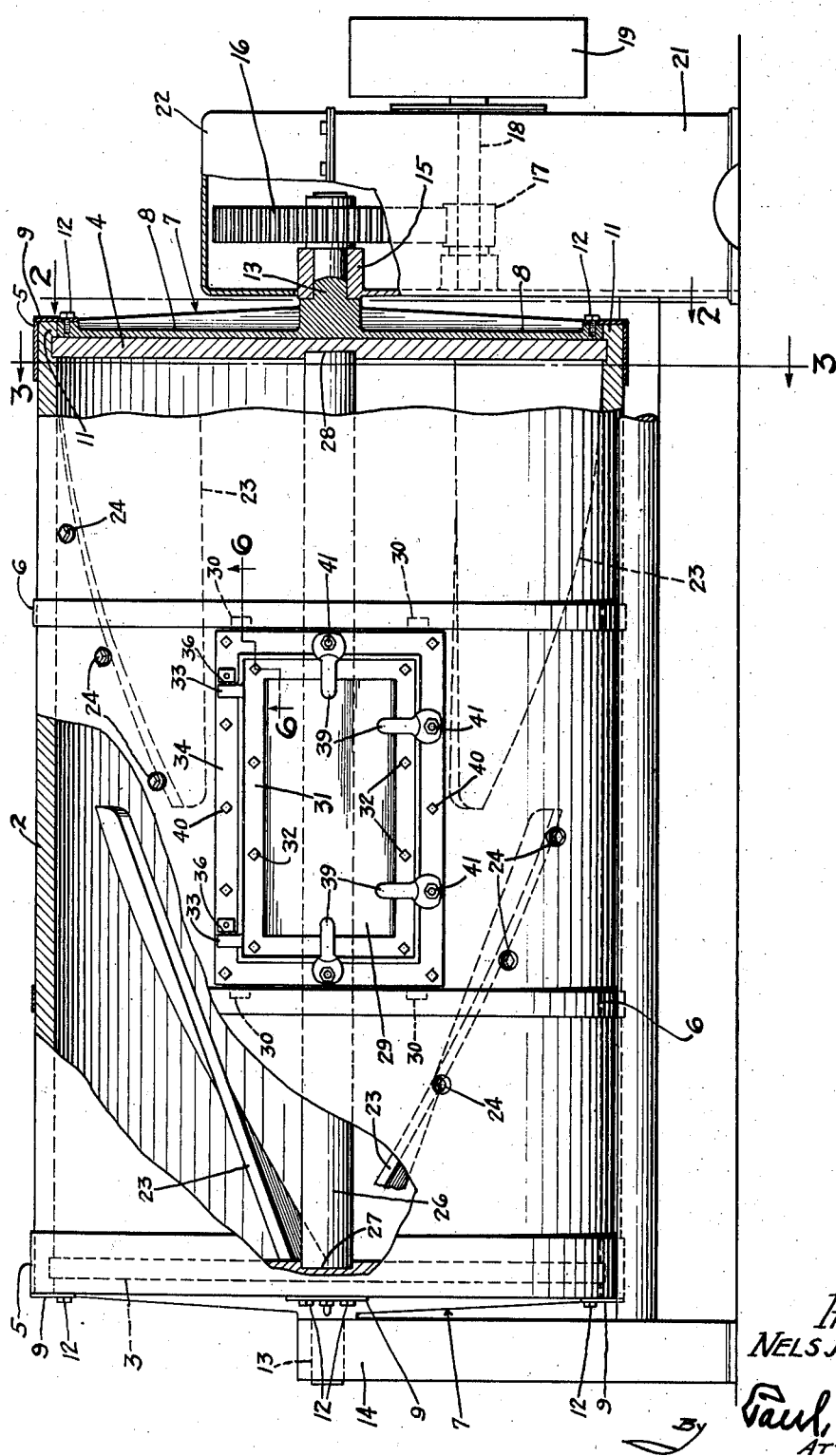
Figure 1 is a side view of my improved churn, partially broken away to more clearly illustrate the means for rotatably supporting the cylinder and the arrangement of the vanes therein.

The novel churn herein disclosed is shown comprising a wooden cylinder, generally indicated by the numeral 2, and comprising end walls 3 and 4. Suitable hoops 5 and 6 are fitted to the periphery of the cylinder in the usual manner to secure together the usual staves which constitute the wall of the cylinder. The hoops or metallic bands 5 at the ends of the cylinder are shown relatively wider than the inner bands 6, for purposes hereinafter to be described.

An important feature of the invention resides in the novel manner in which the cylinder is supported, whereby the inner surface of the end walls of the cylinder are devoid of bolts, screws, and other metallic parts, which is highly desirable in apparatus of this general character. To thus support the cylinder, the end hoops or bands 5 of the cylinder are made relatively wider than the hoops 6, whereby a pair of spiders, generally indicated by the numeral 7, may be secured thereto. Each spider comprises a plurality of radial arms 8 having enlarged terminals adapted to be suitably secured to plates 9, welded or otherwise fixed to the metallic bands 5, as clearly illustrated in Figures 1 and 2. The terminals of the arms 8 are shown fitted against the projecting flange 11 of the cylinder and are secured to the plates 9 by suitable bolts 12. The spiders 7 are seated against their respective end walls of the cylinder, and when secured to the plate portions 9, become in effect, an integral part of the cylinder.

Each spider has a trunnion 13 axially alined with the cylinder, and adapted to be received in suitable bearings 14 and 15 supported upon a suitable foundation or floor, as indicated in Figure 1. The trunnion 13 supported in the bearing 15, is shown relatively longer than the trunnion at the opposite end of the cylinder, and has secured thereto a gear wheel 16, shown meshing with a pinion 17 secured to an operating shaft 18. A suitable pulley 19 is shown secured to the shaft 18, whereby said shaft may be driven from a suitable source of power, not shown. The gear drive 16—17 is shown supported within a suitable housing 21, the upper portion 22 of which is preferably removably mounted whereby access may be had to the drive.

By securing the spiders 7 to the ends of the cylinder, as above described, it is to be noted that the end walls 3 and 4 of the cylinder are not pierced by bolts or screws of any kind, the spiders being secured to the cylinder at the extremities of their arms 8 only. This is a desirable feature in that it eliminates bolt heads and other metallic parts within the churn, which have a tendency to cause deterioration of the wood, which may affect the quality of the resultant butter or product. The interior of the churn is also much easier to maintain clean and sanitary, when devoid of metallic parts, which is an important factor in apparatus of this general type.

Figure 4:
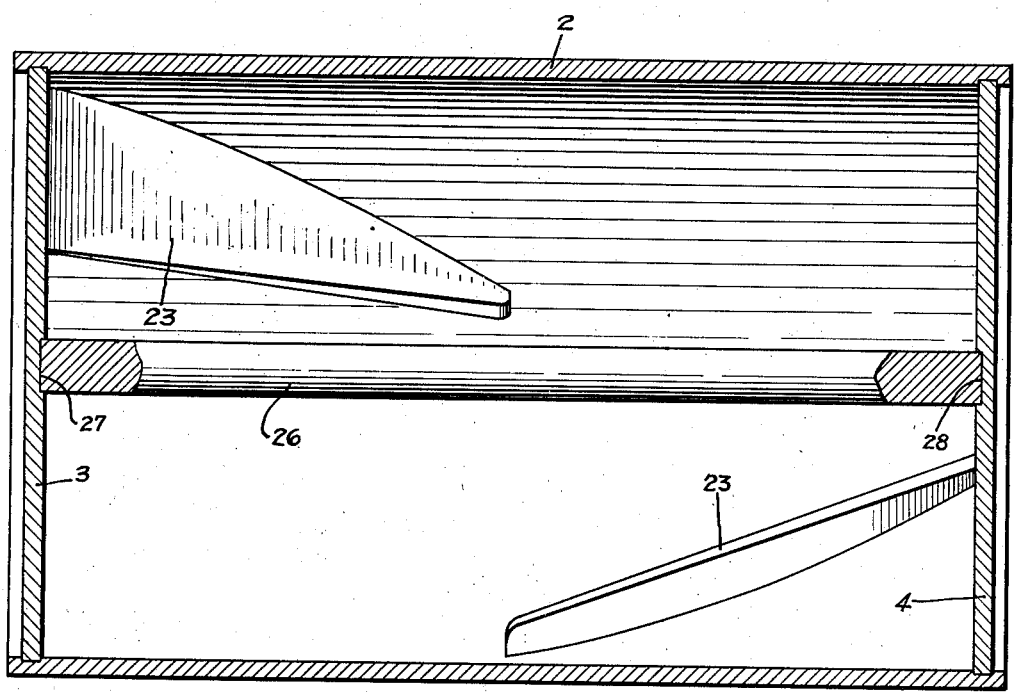
Figure 4 is a longitudinal sectional view of the cylinder showing how the vanes are inclined in opposite directions to thereby cause the contents thereof to be worked inwardly towards the center of the cylinder when the latter is rotated.
Figure 5:
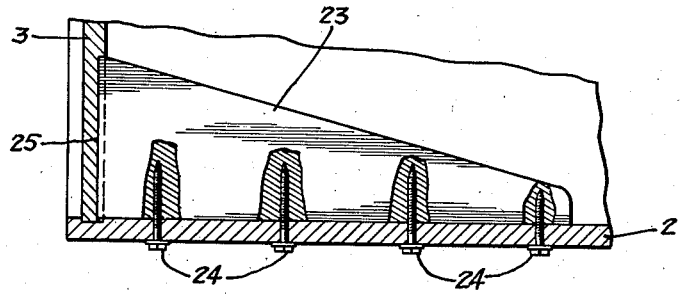
Figure 5 is a detail sectional view showing the preferred manner of securing the vanes in position within the cylinder.

Another important feature of the invention resides in the novel means provided within the cylinder for agitating and working the contents thereof. As clearly illustrated in Figures 1, 3, and 4, each end of the cylinder is provided with a plurality of vanes 23 which preferably are secured to the side wall of the cylinder by suitable bolts 24, preferably threaded into the vanes from the exterior of the cylinder, as best shown in Figure 5. The outer ends of the vanes 23 may be fitted into suitable recesses or grooves 25, provided in the end walls 3 and 4 of the cylinder, and which provide lateral supports therefor. The outer ends of the vanes 23 are relatively wider than the inner ends thereof and said vanes are preferably spiral shaped, as clearly illustrated in Figure 1. The inner ends of the vanes terminate adjacent the vertical center line of the cylinder. It is to be further noted that the vanes at one end of the cylinder are oppositely disposed with respect to the vanes at the other end thereof, whereby when the cylinder is rotated in one direction, the cream or butter contained therein will be constantly worked inwardly towards the center of the churn, whereby a better agitating action is obtained than is possible in churns provided with the usual revolving rolls or other forms of movable elements. To further improve the agitating and butter-working action of the vanes 23 on the product, they are preferably arranged as best shown in Figure 3, wherein it is to be noted that they are not radially disposed with respect to the cylinder axis, but are tangent to an imaginary circle, indicated by the broken line 20, drawn about the axis of the cylinder.

Another feature of the invention resides in the provision of a baffle member 26, preferably cylindrical in cross-section, and which is axially mounted within the cylinder. The ends of this baffle are shown supported in suitable recesses 27 and 28 provided in the end walls 3 and 4, respectively, as best shown in Figure 4. The baffle 26 is preferably fixedly mounted in the cylinder, and cooperates with the vanes 23 to agitate the cream and work the butter, its position within the cylinder being such that when the cream and butter slides off, or discharges from the vanes 23, it will impinge against the baffle 26, whereby it is further broken up or agitated, as will readily be understood by reference to Figures 3 and 4.

By making the outer ends of the vanes 23 relatively wider than the inner ends thereof, and, by arranging the vanes at an incline, when the cylinder is rotated, greater portions of the cream will be carried upwardly at the outer ends of the cylinder, and will be circulated or moved inwardly towards the center thereof from both ends of the cylinder, whereby better agitation of the contents is obtained, with the result that the churning operation is expedited. It will also be seen that by thus arranging the vanes within the cylinder, a more efficient working action is imparted to the butter, because it is constantly being worked inwardly from each end of the cylinder, as the latter is rotated. When the churning operation has been completed and the cover or door 29 is removed or opened, the butter will be disposed substantially at the center of the cylinder, whereby it may be conveniently removed.

Another important feature of the invention resides in the construction of the door 29 and the mounting thereof, whereby a minimum of metal is exposed to the contents of the cylinder at this point. The door 29, as shown in Figure 1, comprises a rectangular frame 31 suitably secured thereto by bolts 32. This frame prevents warping of the door, and is shown provided with projecting lugs 33 pivotally secured to a frame 34 surrounding an opening 35 in the wall of the churn, as clearly illustrated in Figures 1 and 6. Suitable pivots 36 connect the lugs 33 of the door to the frame 34.

Figure 6:
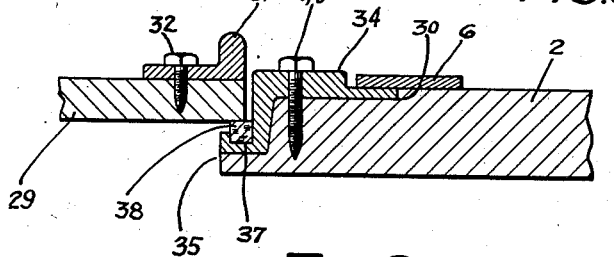
Figure 6 is an enlarged detail sectional view on the line 6—6 of Figure 1, showing the means for supporting the door in leak-tight relation.

The annular frame 34 surrounding the door opening 35 in the cylinder wall, is shown provided with an annular groove 37 adapted to receive a suitable packing 38 against which the door 29 is seated, as best shown in Figure 6. Suitable clamping elements 39 and bolts or studs 41 provide means for tightly securing the door 29 to its seat, as will readily be understood by reference to Figure 1. The frame 34 is shown comprising a plurality of lugs 30 which are fitted under the hoops 6, as best shown in Figure 6, whereby said hoops secure the frames 34 to the cylinder wall. Bolts 40 pass through apertures in the frame 34 and are screwed into the cylinder wall and thus cooperate with the hoops 6, to firmly secure said frame to the cylinder wall. It is to be noted that the bolts 40 do not pass through the wall of the cylinder, thereby minimizing the exposure of metal within the cylinder.

The novel churn herein disclosed is very simple in construction and, as hereinbefore stated, comprises no relatively movable parts within the cylinder. All of the agitating and butter working elements provided in the cylinder are fixedly mounted, whereby the interior of the churn is rendered more sanitary and easier to clean because of the elimination of cracks and crevices, and metallic parts which are now common in ordinary churns. In actual operation, it has been found that by permanently securing the vanes in the cylinder and arranging them as herein disclosed, a better churning action is obtained because of an end to end concussion as well as a vertical concussion being imparted to the cream. Also, as a result of the unique design and shape of the vanes, the butter is subjected to less friction, whereby it becomes less "salvy", and a higher grade product is obtained.

By the elimination of rotating rolls in the cylinder, no packing boxes are required for bearings, etc., which simplifies construction, and also renders the churn more sanitary. Because of the vanes 23 being slightly spiral in shape and wider at the ends of the cylinder, the working action imparted to the butter is such that the butter is thoroughly worked and the salt and moisture uniformly distributed and worked into the butter, with the result that the butter will be worked into a solid mass of uniform composition. This is highly desirable in butter making, as high quality butter must be of uniform composition and substantially free from loose moisture.

In Figure 7, I have shown a churn comprising a cylinder 44 having a plurality of radially disposed vanes 42 fixedly secured therein. A baffle 43 similar to the baffle 26, shown in the previous figure, is also shown provided in the cylinder 44 and cooperates with the vanes 42 to agitate and work the contents of the cylinder.

By working the butter in the churn by an end to end concussion, and by vertical concussion, as herein disclosed, the butter does not rub against the ends of the cylinder at all in the working process. It is constantly worked inwardly from the ends of the cylinder and becomes massed in the center thereof, whereby it is worked largely within its own mass. By thus working the butter, it is not subjected to a squeezing, rubbing, or sliding friction, as is common in ordinary churns employing a plurality of rotating rolls or elements between which the butter is worked. I have also found that by working the butter in accordance with the novel concussion principle herein disclosed, less breaking down of the body structure of the butter results, and the butter will also have a more uniform waxy body. The moisture and salt content is also distributed more uniformly throughout the entire mass of butter, and less air is worked into the butter which, together with the reduction in tendency to make the butter greasy, sticky, and salvy, will result in the butter having better keeping qualities, as it reduces the tendency of oxidation when in storage. Also, by fixedly mounting the vanes 23 and the member 26 in the cylinder, the churn is rendered far more sanitary than present day churns which employ a plurality of movable or rotating elements within the churn for working the butter. By eliminating all movable parts within the cylinder, no packing glands or bearings of any kind are present within the cylinder, whereby the usual danger of grease and oil working into the butter from such glands and bearings is positively eliminated.

I claim as my invention:

1. A churn comprising a pair of supports and a cylinder rotatably mounted between said supports, said cylinder having normally imperforate ends each lying in a single plane, a plurality of vanes associated with the inner cylindrical wall of said cylinder, the longitudinal axes of said vanes with respect to said wall each defining a spiral, and means for rotating said cylinder, said means being secured to the exterior surface of the cylinder exteriorly of the end walls.

2. A churn comprising a pair of supports and a cylinder rotatably mounted between said supports, a plurality of vanes associated with the inner cylindrical wall of said cylinder, the longitudinal axes of said vanes with respect to said wall each defining a spiral, a baffle element within said cylinder cooperating with the vanes to agitate the cream and work the butter, and means for rotating said cylinder, said means being secured to the exterior surface of the cylinder thereby to permit the interior surface of the cylinder, except for said vanes, to present a smooth unbroken surface.

3. A churn comprising a pair of supports and a cylinder rotatably mounted between said supports, said cylinder having normally imperforate ends each lying in a single plane, a group of vanes associated with the inner cylindrical wall of said cylinder, said vanes extending substantially from one end wall of the cylinder to substantially the middle transverse axis of the cylinder, the longitudinal axes of said vanes with respect to said wall each defining a spiral, a second group of vanes associated with the inner cylindrical wall of said cylinder, said second group of vanes extending substantially from the opposite end wall of the cylinder to substantially the middle transverse axis of the cylinder, the longitudinal axes of said second group of vanes with respect to said cylindrical wall defining spirals in reverse direction to the spirals of the first mentioned group of vanes, said groups of vanes serving to work the butter to the central transverse axis of the cylinder, and means for rotating said cylinder.

4. A churn comprising a pair of supports and a cylinder rotatably mounted between said supports, a group of vanes associated with the inner cylindrical wall of said cylinder, said vanes extending substantially from one end wall of the cylinder to substantially the middle transverse axis of the cylinder, the longitudinal axes of said vanes with respect to said wall each defining a spiral, a second group of vanes associated with the inner cylindrical wall of said cylinder, said second group of vanes extending substantially from the opposite end wall of the cylinder to substantially the middle transverse axis of the cylinder, the longitudinal axes of said second group of vanes with respect to said cylindrical wall defining spirals in reverse direction to the spirals of the first mentioned group of vanes, a baffle element within the cylinder, said groups of vanes and baffle element serving to work the butter to the central transverse axis of the cylinder, and means for rotating said cylinder.

5. A churn comprising a pair of supports and a cylinder rotatably mounted between said supports, a plurality of vanes associated with the inner cylindrical wall of said cylinder, the longitudinal axes of said vanes with respect to said wall each defining a spiral, the side walls of said vanes being disposed in non-radial planes that are tangent to an imaginary cylinder disposed longitudinally of and concentric with the axis of the cylinder, and means for rotating said cylinder.

6. A churn comprising a pair of supports and a cylinder rotatably mounted between said supports, a plurality of vanes associated with the inner cylindrical wall of said cylinder, the longitudinal axes of said vanes with respect to said wall each defining a spiral, the side walls of said vanes being disposed in non-radial planes that are tangent to an imaginary cylinder disposed longitudinally of and concentric with the axis of the cylinder, a baffle element extending longitudinally of the cylinder, and means for rotating said cylinder.

7. A churn comprising a pair of supports, a cylinder journalled between said supports, a band encircling each end portion of the outer cylindrical surface of said cylinder and having projections extending radially inwardly at the end of the cylinder, spiders secured to said projections, said spiders having bearings axially aligned with the longitudinal axis of said cylinder, and means for rotating said cylinder.

8. A churn comprising a pair of supports and a cylinder rotatably mounted between said supports, a plurality of vanes associated with the inner cylindrical wall of said cylinder, the longitudinal axes of said vanes with respect to said wall each defining a spiral, any cross section of said vanes being directed inwardly from the wall of the cylinder in a single straight line which is inclined to any radius of the drum intersecting any said cross section.

NELS J. HEDLUND.